US008932483B2

(12) United States Patent
Kim

(10) Patent No.: US 8,932,483 B2
(45) Date of Patent: *Jan. 13, 2015

(54) LOW NAPHTHENIC LIQUID CRYSTALLINE POLYMER COMPOSITION

(71) Applicant: Ticona LLC, Florence, KY (US)

(72) Inventor: Young Shin Kim, Erlanger, KY (US)

(73) Assignee: Ticona LLC, Florence, KY (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/674,970

(22) Filed: Nov. 13, 2012

(65) Prior Publication Data

US 2013/0122273 A1 May 16, 2013

Related U.S. Application Data

(60) Provisional application No. 61/559,822, filed on Nov. 15, 2011, provisional application No. 61/678,267, filed on Aug. 1, 2012, provisional application No. 61/678,292, filed on Aug. 1, 2012.

(51) Int. Cl.
C09K 19/38 (2006.01)
C09K 19/54 (2006.01)
C08K 5/09 (2006.01)
C08G 63/60 (2006.01)
C08L 67/03 (2006.01)
C08G 63/91 (2006.01)
C08K 5/103 (2006.01)
C08K 7/14 (2006.01)

(52) U.S. Cl.
CPC .............. C09K 19/54 (2013.01); C08G 63/605 (2013.01); C08G 63/916 (2013.01); C09K 19/3809 (2013.01); C08K 5/103 (2013.01); C08K 7/14 (2013.01)
USPC ............... 252/299.01; 252/299.5; 524/286; 524/296

(58) Field of Classification Search
USPC ........... 252/299.01, 299.5; 428/220; 524/286, 524/296
See application file for complete search history.

(56) References Cited

U.S. PATENT DOCUMENTS

| 4,083,829 A | 4/1978 | Calundann et al. |
| 4,161,470 A | 7/1979 | Calundann |
| 4,184,996 A | 1/1980 | Calundann |
| 4,219,461 A | 8/1980 | Calundann |
| 4,256,624 A | 3/1981 | Calundann |
| 4,279,803 A | 7/1981 | Calundann |
| 4,318,841 A | 3/1982 | East et al. |
| 4,330,457 A | 5/1982 | East et al. |
| 4,337,190 A | 6/1982 | Calundann |
| 4,339,375 A | 7/1982 | Calundann et al. |
| 4,351,917 A | 9/1982 | Calundann et al. |
| 4,351,918 A | 9/1982 | Charbonneau et al. |
| 4,355,132 A | 10/1982 | East et al. |
| 4,355,134 A | 10/1982 | Charbonneau et al. |
| 4,375,530 A | 3/1983 | Hay et al. |
| 4,393,191 A | 7/1983 | East |
| 4,421,908 A | 12/1983 | East |
| 4,429,105 A | 1/1984 | Charbonneau |
| 4,434,262 A | 2/1984 | Buckley et al. |
| 4,473,682 A | 9/1984 | Calundann et al. |
| 4,522,974 A | 6/1985 | Calundann et al. |
| 4,892,926 A | 1/1990 | Suenaga et al. |
| 5,204,443 A | 4/1993 | Lee et al. |
| 5,204,473 A | 4/1993 | Winter et al. |
| 5,298,593 A | 3/1994 | Fujiwara et al. |
| 5,326,848 A | 7/1994 | Kashimura et al. |
| 5,352,746 A | 10/1994 | Asai et al. |
| 5,446,124 A | 8/1995 | Niwano et al. |
| 5,508,374 A | 4/1996 | Lee et al. |
| 5,541,240 A | 7/1996 | Makhija et al. |
| 5,616,680 A | 4/1997 | Linstid, III |
| 5,663,276 A | 9/1997 | Yoneta et al. |
| 5,679,456 A | 10/1997 | Sakai et al. |
| 5,710,237 A | 1/1998 | Waggoner et al. |
| 5,766,507 A | 6/1998 | Naki |
| 5,891,532 A | 4/1999 | Furuta et al. |
| 5,904,581 A | 5/1999 | Pope et al. |
| 5,971,818 A | 10/1999 | Juntwait et al. |

(Continued)

FOREIGN PATENT DOCUMENTS

| EP | 0 565 353 A1 | 10/1993 |
| EP | 0 856 558 A1 | 8/1998 |

(Continued)

OTHER PUBLICATIONS

Abstract of Chinese Patent—CN101200641, Jun. 18, 2008, 1 page.

(Continued)

Primary Examiner — Shean C Wu
(74) Attorney, Agent, or Firm — Dority & Manning, P.A.

(57) ABSTRACT

A thermoplastic composition that comprises a low-naphthenic, thermotropic liquid crystalline polymer blended with a flow modifier is provided. The flow modifier is an aromatic carboxylic acid that contains one or more carboxyl functional groups. Without intending to be limited by theory, it is believed that the functional groups can react with the polymer chain to shorten its length and thus reduce melt viscosity. It is also believed that such acids can combine smaller chains of the polymer together after they have been cut during processing. This helps maintain the mechanical properties of the composition even after its melt viscosity has been reduced. As a result of the present invention, the melt viscosity of the thermoplastic composition is generally low enough so that it can readily flow into the cavity of a mold having small dimensions.

29 Claims, 5 Drawing Sheets

(56) References Cited

U.S. PATENT DOCUMENTS

| | | | |
|---|---|---|---|
| 5,976,406 A | 11/1999 | Nagano et al. |
| 5,980,308 A | 11/1999 | Hu et al. |
| 5,989,758 A | 11/1999 | Komatsu et al. |
| 5,997,765 A | 12/1999 | Furuta et al. |
| 6,010,760 A | 1/2000 | Miyazaki et al. |
| 6,046,300 A | 4/2000 | Umetsu et al. |
| 6,063,848 A | 5/2000 | Murakami et al. |
| 6,114,492 A | 9/2000 | Linstid, III et al. |
| 6,140,455 A | 10/2000 | Nagashima et al. |
| 6,294,618 B1 | 9/2001 | Soelch |
| 6,296,930 B1 | 10/2001 | Ohbe et al. |
| 6,306,946 B1 | 10/2001 | Long et al. |
| 6,376,076 B1 | 4/2002 | Ohbe et al. |
| 6,514,611 B1 | 2/2003 | Shepherd et al. |
| 6,528,164 B1 | 3/2003 | Ohbe et al. |
| 6,582,625 B2 | 6/2003 | Nagashima et al. |
| 6,613,847 B2 | 9/2003 | Soelch |
| 6,649,730 B2 | 11/2003 | Okamoto et al. |
| 6,656,386 B2 | 12/2003 | Suenaga et al. |
| 6,656,578 B2 | 12/2003 | Ohbe et al. |
| 6,680,002 B2 | 1/2004 | Yamauchi et al. |
| 6,702,955 B1 | 3/2004 | Murakami et al. |
| 6,702,956 B2 | 3/2004 | Maeda et al. |
| 6,733,691 B2 | 5/2004 | Nagano et al. |
| 6,756,427 B2 | 6/2004 | Maeda |
| 6,758,989 B2 | 7/2004 | Miyashita et al. |
| 6,773,287 B2 | 8/2004 | Takashita |
| 6,797,198 B1 | 9/2004 | Miyashita et al. |
| 6,824,396 B2 | 11/2004 | Koopman et al. |
| 6,833,405 B1 | 12/2004 | Cottis |
| 6,861,463 B2 | 3/2005 | Cottis |
| 6,966,793 B2 | 11/2005 | Brekosky et al. |
| 6,984,712 B2 | 1/2006 | Ueno et al. |
| 7,014,921 B2 | 3/2006 | Okamoto et al. |
| 7,063,892 B2 | 6/2006 | Okamoto |
| 7,137,832 B2 | 11/2006 | Mongold et al. |
| 7,175,779 B1 | 2/2007 | Kricheldorf et al. |
| 7,231,776 B2 | 6/2007 | Cäsar et al. |
| 7,258,567 B2 | 8/2007 | Tanaka et al. |
| 7,304,121 B2 | 12/2007 | Kato et al. |
| 7,335,318 B2 | 2/2008 | Asahara et al. |
| 7,344,657 B2 | 3/2008 | Okamoto et al. |
| 7,380,527 B2 | 6/2008 | Reisser |
| 7,393,467 B2 | 7/2008 | Asahara et al. |
| 7,405,250 B2 | 7/2008 | Kim |
| 7,517,240 B2 | 4/2009 | Ma |
| 7,540,785 B1 | 6/2009 | Zhao |
| 7,578,950 B2 | 8/2009 | Kirchner et al. |
| 7,618,552 B2 | 11/2009 | Hosoda et al. |
| 7,648,748 B2 | 1/2010 | Nakane et al. |
| 7,789,670 B2 | 9/2010 | Fukatsu et al. |
| 7,799,855 B2 | 9/2010 | Ebeling et al. |
| 7,824,572 B2 | 11/2010 | Okamoto |
| 7,825,176 B2 | 11/2010 | Kim et al. |
| 7,862,745 B2 | 1/2011 | Tano et al. |
| 7,888,450 B2 | 2/2011 | Uehira |
| 7,980,897 B2 | 7/2011 | Fukatsu et al. |
| 8,071,711 B2 | 12/2011 | Hosoda et al. |
| 8,142,683 B2 | 3/2012 | Murouchi et al. |
| 8,192,219 B2 | 6/2012 | Satoh |
| 8,192,645 B2 | 6/2012 | Murouchi et al. |
| 8,202,448 B2 | 6/2012 | Fukuhara et al. |
| 8,231,805 B2 | 7/2012 | Fukuhara et al. |
| 8,231,807 B2 | 7/2012 | Yonezawa et al. |
| 8,272,879 B2 | 9/2012 | Fukatsu et al. |
| 8,337,719 B2 | 12/2012 | Hosoda et al. |
| 8,432,484 B2 | 4/2013 | Christison |
| 8,646,994 B2 * | 2/2014 | Kim et al. ............ 396/529 |
| 2002/0190432 A1 | 12/2002 | Shiwaku et al. |
| 2004/0092143 A1 | 5/2004 | Fromm et al. |
| 2004/0235998 A1 | 11/2004 | Kirchner |
| 2005/0191877 A1 | 9/2005 | Huang |
| 2005/0260372 A1 | 11/2005 | Matsuoka et al. |
| 2006/0025561 A1 | 2/2006 | Watanabe et al. |
| 2006/0073306 A1 | 4/2006 | Nakane et al. |
| 2007/0049706 A1 | 3/2007 | Siripurapu et al. |
| 2007/0106035 A1 | 5/2007 | Gomurashvili et al. |
| 2007/0293633 A1 | 12/2007 | Hosoda et al. |
| 2008/0002970 A1 | 1/2008 | Cheng et al. |
| 2008/0139754 A1 | 6/2008 | Uehara et al. |
| 2008/0285968 A1 | 11/2008 | Chang et al. |
| 2009/0027586 A1 | 1/2009 | Kumai et al. |
| 2009/0275697 A1 | 11/2009 | Waggoner et al. |
| 2010/0326699 A1 | 12/2010 | Greyling |
| 2011/0189454 A1 | 8/2011 | Fukuhara et al. |
| 2011/0189455 A1 | 8/2011 | Fukuhara et al. |
| 2011/0210290 A1 | 9/2011 | Harada et al. |
| 2011/0233462 A1 | 9/2011 | Bu et al. |
| 2012/0022202 A1 | 1/2012 | Suh et al. |
| 2012/0119142 A1 | 5/2012 | Osato et al. |
| 2012/0135228 A1 | 5/2012 | Fukuhara et al. |
| 2012/0153224 A1 | 6/2012 | Yonezawa et al. |
| 2012/0190813 A1 | 7/2012 | Taguchi |
| 2012/0199790 A1 | 8/2012 | Yun et al. |
| 2012/0235089 A1 | 9/2012 | Nakayama et al. |
| 2013/0015400 A1 | 1/2013 | Matsubara et al. |
| 2013/0015401 A1 | 1/2013 | Matsubara et al. |
| 2013/0022828 A1 | 1/2013 | Matsubara et al. |
| 2013/0026413 A1 | 1/2013 | Uchida et al. |
| 2013/0119317 A1 | 5/2013 | Kim et al. |
| 2013/0121682 A1 | 5/2013 | Kim et al. |
| 2013/0122272 A1 | 5/2013 | Kim |
| 2013/0122274 A1 | 5/2013 | Kim et al. |
| 2013/0122758 A1 | 5/2013 | Kim et al. |
| 2013/0123420 A1 | 5/2013 | Kim |

FOREIGN PATENT DOCUMENTS

| | | | |
|---|---|---|---|
| EP | 1 621 319 A1 | 2/2006 |
| EP | 1 792 942 A1 | 6/2007 |
| WO | WO 95/33803 A1 | 12/1995 |
| WO | WO 02/02717 A2 | 1/2002 |
| WO | WO 2004/058851 A1 | 7/2004 |

OTHER PUBLICATIONS

Abstract of Japanese Patent—JPH0649187, Feb. 22, 1994, 2 pages.
Abstract of Japanese Patent—JPH06192406, Jul. 12, 1994, 2 pages.
Abstract of Japanese Patent—JPH06192407, Jul. 12, 1994, 2 pages.
Abstract of Japanese Patent—JPH06234835, Aug. 23, 1994, 2 pages.
Abstract of Japanese Patent—JPH0718162, Jan. 20, 1995, 1 page.
Abstract of Japanese Patent—JPH07188403, Jul. 25, 1995, 2 pages.
Abstract of Japanese Patent—JPH0859965, Mar. 5, 1996, 1 page.
Abstract of Japanese Patent—JPH09143347, Jun. 3, 1997, 1 page.
Abstract of Japanese Patent—JPH0919938, Jan. 21, 1997, 1 page.
Abstract of Japanese Patent—JPH09204951, Aug. 5, 1997, 2 pages.
Abstract of Japanese Patent—JPH09249813, Sep. 22, 1997, 2 pages.
Abstract of Japanese Patent—JP09297256, Nov. 18, 1997, 2 pages.
Abstract of Japanese Patent—JPH1160927, Mar. 5, 1999, 2 pages.
Abstract of Japanese Patent—JPH11147999, Jun. 2, 1999, 1 page.
Abstract of Japanese Patent—JP2000026743, Jan. 25, 2000, 1 page.
Abstract of Japanese Patent—JP2000191755, Jul. 11, 2000, 2 pages.
Abstract of Japanese Patent—JP2000313812, Nov. 14, 2000, 1 page.
Abstract of Japanese Patent—JP2001088173, Apr. 3, 2001, 2 pages.
Abstract of Japanese Patent—JP2001106882, Apr. 17, 2001, 1 page.
Abstract of Japanese Patent—JP2001129856, May 15, 2001, 2 pages.
Abstract of Japanese Patent—JP2003109700, Apr. 11, 2003, 1 page.
Abstract of Japanese Patent—JP2003268252, Sep. 25, 2003, 1 page.
Abstract of Japanese Patent—JP2004182748, Jul. 2, 2004, 1 page.
Abstract of Japanese Patent—JP2004182920, Jul. 2, 2004, 1 page.
Abstract of Japanese Patent—JP2004256656, Sep. 16, 2004, 2 pages.
Abstract of Japanese Patent—JP2004263043, Sep. 24, 2004, 1 page.
Abstract of Japanese Patent—JP2005248052, Sep. 15, 2005, 1 page.
Abstract of Japanese Patent—JP2005276758, Oct. 6, 2005, 2 pages.
Abstract of Japanese Patent—JP2005298772, Oct. 27, 2005, 1 page.
Abstract of Japanese Patent—JP2006008964, Jan. 12, 2006, 1 page.
Abstract of Japanese Patent—JP2007238851, Sep. 20, 2007, 1 page.
Abstract of Japanese Patent—JP2008075079, Apr. 3, 2008, 1 page.
Abstract of Japanese Patent—JP2008138181, Jun. 19, 2008, 1 page.
Abstract of Japanese Patent—JP2009108179, May 21, 2009, 1 page.

(56) References Cited

OTHER PUBLICATIONS

Abstract of Japanese Patent—JP2009108180, May 21, 2009, 1 page.
Abstract of Japanese Patent—JP2009191088, Aug. 27, 2009, 1 page.
Abstract of Japanese Patent—JP2010065179, Mar. 25, 2010, 1 page.
Abstract of Japanese Patent—JP2010138228, Jun. 24, 2010, 1 page.
Abstract of Japanese Patent—JP2010174114, Aug. 12, 2010, 1 page.
Abstract of Korean Patent—KR20120052647, May 24, 2012, 1 page.
Abstract of WO Patent—WO2005093908, Oct. 6, 2005, 2 pages.
Abstract of WO Patent—WO2005116141, Dec. 8, 2005, 1 page.
Abstract of WO Patent—WO2006025546, Mar. 9, 2006, 1 page.
Abstract of WO Patent—WO2006123824, Nov. 23, 2006, 1 page.
Abstract of WO Patent—WO2010013578, Feb. 4, 2010, 1 page.
Abstract of WO Patent—WO2012050082, Apr. 19, 2012, 1 page.
Abstract of Taiwan Patent—TW397859, Jul. 11, 2000, 1 page.
Abstract of Taiwan Patent—TW200831584, Aug. 1, 2008, 1 page.
Article—Joseph A. Grande, "Smaller, Thinner Connectors Drive LCP Growth," Plastic Technology, Oct. 2007, 4 pages.
Article—Wallenberger, et al., "Glass Fibers," *ASM Handbook*, vol. 21, 2001, pp. 27-34.
Paper—Liu et al., "Surface Mountain of Connectors," Miniaturisation Nepcon Conference during Globlatronics '95, 1995, 15 pages.
Product Information—Compact Camera Module Assembly—Customized Adhesives from Delo Industrial Adhesives, 2010, 12 pages.
Product and Property Guide for DuPont™ Zenite® LCP—Liquid Crystal Polymer Resin from E. I. du Pont de Nemours and Company, 2006, 33 pages.
Search Report and Written Opinion for PCT/US2012/064751 dated Mar. 12, 2013, 14 pages.
Taiwanese Search Report for Patent Appiication No. 101142249 dated Sep. 15, 2014, 1 page.

* cited by examiner

LOW NAPHTHENIC LIQUID CRYSTALLINE POLYMER COMPOSITION

RELATED APPLICATIONS

This application claims filing benefit of U.S. Provisional Patent Application Ser. No. 61/559,822 filed on Nov. 15, 2011, 61/678,267 filed on of Aug. 1, 2012; and 61/678,292 filed on Aug. 1, 2012; which are incorporated herein in their entirety.

BACKGROUND OF THE INVENTION

Electrical components often contain molded parts that are formed from a liquid crystalline, thermoplastic resin. Recent demands on the electronic industry have dictated a decreased size of such components to achieve the desired performance and space savings. One such component is an electrical connector, which can be external (e.g., used for power or communication) or internal (e.g., used in computer disk drives or servers, link printed wiring boards, wires, cables and other EEE components). Unfortunately, several different challenges exist for successfully forming liquid crystalline polymer parts for electrical components with a small dimension.

One problem with many conventional liquid crystalline polymers, for instance, is that they tend to display a very high solid-to-liquid transition temperature ("melting temperature"), which precludes their ability to flow well at temperatures below the decomposition temperature. To suppress the melting point and generate materials that can flow, additional monomers are often incorporated into the polymer backbone as a repeating unit. One commonly employed melting point suppressant is naphthalene-2,6-dicarboxylic acid ("NDA"), which is generally believed to disrupt the linear nature of the polymer backbone and thereby reduce the melting temperature. The melting point of the polymer may be lowered by substituting NDA for a portion of the terephthalic acid in a polyester of terephthalic acid, hydroquinone and p-hydroxybenzoic acid. In addition to NDA, other naphthenic acids have also been employed as a melt point suppressant. For instance, 6-hydroxy-2-naphthoic acid ("HNA") has been employed as a melting point suppressant for a polyester formed from an aromatic diol and an aromatic dicarboxylic acid. Despite the benefits achieved, the aforementioned polymers still have various drawbacks. For example, the reactivity of the naphthenic acids with other monomeric constituents can have unintended consequences on the final mechanical and thermal properties of the polymer composition. This is particularly problematic for molded parts having a small dimensional tolerance. In addition to functional concerns, the high cost of naphthenic acids also dictates that the need for others solutions to the problems noted.

Of course, apart from the nature of the polymer itself, other challenges also exist in forming electrical components from liquid crystalline polymers. For instance, due to the manner in which they are employed, most electrical components are required to meet certain flammability standards. Typically, these requirements are achieved by adding flame retardants to the material formulations. However, some types of conventional flame retardants (e.g., halogenated retardants) are undesirable in electrical applications. Furthermore, such flame retardants can also have an adverse impact on the mechanical properties of the resulting molded part.

As such, a need exists for a low naphthenic, liquid crystalline thermoplastic composition that can be more readily formed into a small dimension part, and yet still attain good mechanical and/or flammability properties.

SUMMARY OF THE INVENTION

In accordance with one embodiment of the present invention, a thermoplastic composition is disclosed that comprises at least one thermotropic liquid crystalline polymer. The total amount of repeating units in the polymer derived from naphthenic hydroxcarboxylic and/or naphthenic dicarboxylic acids is no more than 15 mol. %. The thermoplastic composition further comprises at least one aromatic carboxylic acid, and further wherein the thermoplastic composition has a melt viscosity of from about 0.1 to about 80 Pa-s, as determined in accordance with ISO Test No. 11443 at a shear rate of 1000 seconds$^{-1}$ and a temperature that is 15° C. higher than the melting temperature of the composition.

In accordance with another embodiment of the present invention, a molded part is disclosed that has at least one dimension of about 500 micrometers or less. The part contains a thermoplastic composition that comprises at least one thermotropic liquid crystalline polymer. The total amount of repeating units in the polymer derived from naphthenic hydroxcarboxylic and/or naphthenic dicarboxylic acids is no more than 15 mol. %. The thermoplastic composition further comprises at least one aromatic carboxylic acid.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
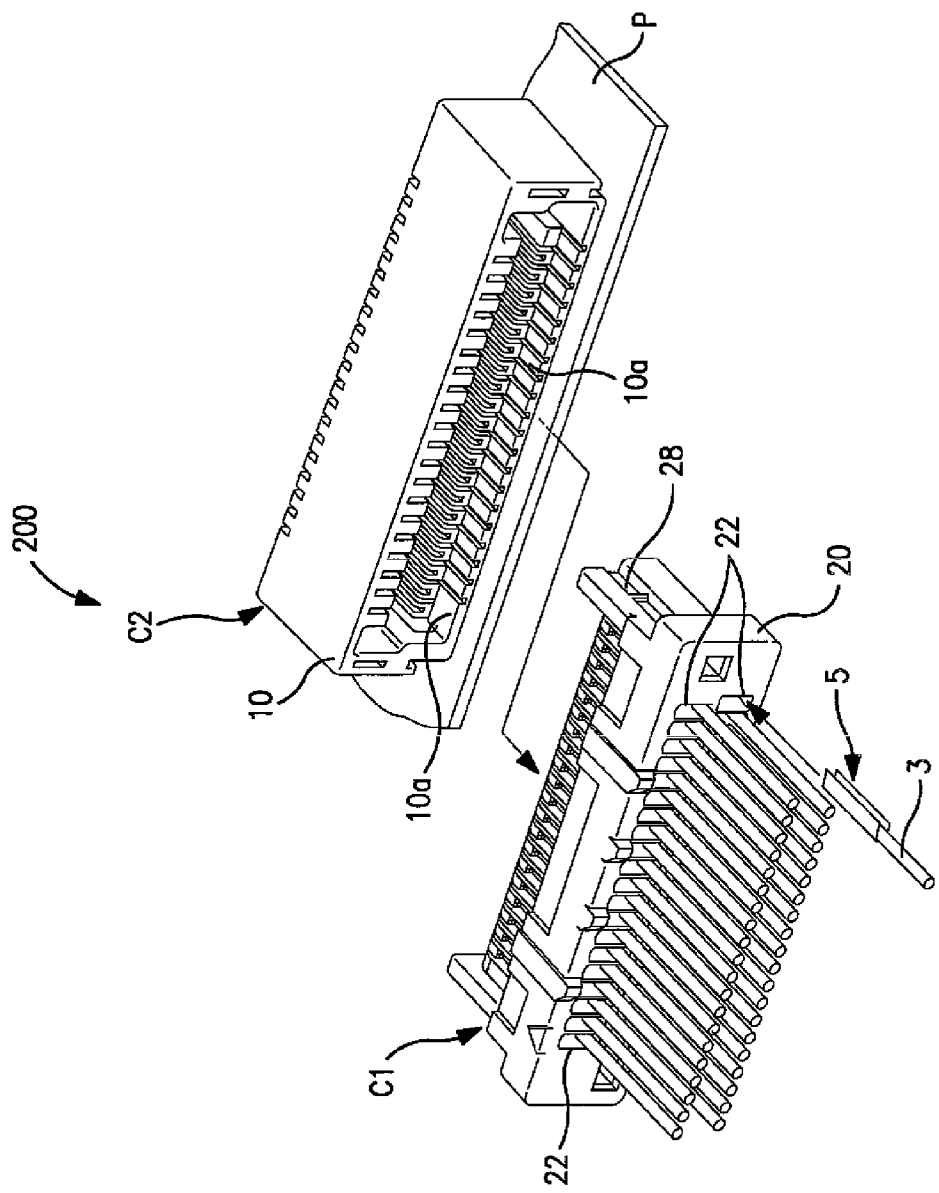
FIG. 1 is an exploded perspective view of one embodiment of a fine pitch electrical connector that may be formed according to the present invention.

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH_2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkoxy" refers to the group —O-alkyl. Alkoxy includes, by way of example, methoxy, ethoxy, n-propoxy, isopropoxy, n-butoxy, t-butoxy, sec-butoxy, and n-pentoxy.

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Aryloxy" refers to the group —O-aryl, which includes, by way of example, phenoxy and naphthyloxy.

"Carboxyl" or "carboxy" refers to —COOH or salts thereof.

"Carboxyl ester" or "carboxy ester" refers to the groups —C(O)O-alkyl, C(O)O-alkenyl, C(O)O-aryl, C(O)O cycloalkyl, —C(O)O-heteroaryl, and —C(O)O-heterocyclic.

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C<ring unsaturation.

"Cycloalkyloxy" refers to —O cycloalkyl.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atoms) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heteroaryloxy" refers to —O-heteroaryl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

"Heterocyclyloxy" refers to the group —O-heterocycyl.

"Acyl" refers to the groups H—C(O)—, alkyl-C(O)—, alkenyl-C(O)—, cycloalkyl-C(O)—, aryl-C(O)—, heteroaryl-C(O)—, and heterocyclic-C(O)—. Acyl includes the "acetyl" group $CH_3C(O)$—.

"Acyloxy" refers to the groups alkyl-C(O)O—, alkenyl-C(O)O—, aryl-C(O)O—, cycloalkyl-C(O)O—, heteroaryl-C(O)O—, and heterocyclic-C(O)O—. Acyloxy includes the "acetyloxy" group $CH_3C(O)O$—.

"Acylamino" refers to the groups —NHC(O)alkyl, —NHC(O)alkenyl, —NHC(O)cycloalkyl, —NHC(O)aryl, —NHC(O)heteroaryl, and —NHC(O)heterocyclic. Acylamino includes the "acetylamino" group —NHC(O)$CH_3$.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

It is to be understood by one of ordinary skill in the art that the present discussion is a description of exemplary embodiments only, and is not intended as limiting the broader aspects of the present invention.

Generally speaking, the present invention is directed to a thermoplastic composition that comprises a low-naphthenic, thermotropic liquid crystalline polymer blended with a flow modifier that helps achieve a low melt viscosity without sacrificing other properties of the composition. More particularly, the flow modifier is an aromatic carboxylic acid that contains one or more carboxyl functional groups. Without intending to be limited by theory, it is believed that the functional groups can react with the polymer chain to shorten its length and thus reduce melt viscosity. It is also believed that such acids can combine smaller chains of the polymer together after they have been cut during processing. This helps maintain the mechanical properties of the composition even after its melt viscosity has been reduced. As a result of the present invention, the melt viscosity of the thermoplastic composition is generally low enough so that it can readily flow into the cavity of a mold having small dimensions. For example, in one particular embodiment, the thermoplastic composition may have a melt viscosity of from about 0.1 to about 80 Pa-s, in some embodiments from about 0.5 to about 50 Pa-s, and in some embodiments, from about 1 to about 30 Pa-s, determined at a shear rate of 1000 seconds$^{-1}$. Melt viscosity may be determined in accordance with ISO Test No. 11443 at a temperature that is 15° C. higher than the melting temperature of the composition (e.g., 350° C.).

Even at such low melt viscosity values, however, a molded part formed from the polymer composition may still possess a relatively high degree of heat resistance. For example, the molded part may possess a "blister free temperature" of about 240° C. or greater, in some embodiments about 250° C. or greater, in some embodiments from about 260° C. to about 320° C., and in some embodiments, from about 270° C. to about 300° C. As explained in more detail below, the "blister free temperature" is the maximum temperature at which a molded part does not exhibit blistering when placed in a heated silicone oil bath. Such blisters generally form when the vapor pressure of trapped moisture exceeds the strength of the part, thereby leading to delamination and surface defects.

Conventionally, it was believed that thermoplastic compositions having the low viscosity noted above would not also possess sufficiently good thermal and mechanical properties to enable their use in certain types of applications. Contrary to conventional thought, however, the thermoplastic composition of the present invention has been found to possess excellent mechanical properties. For example, the composition may possess a high impact strength, which is useful when forming small parts. The composition may, for instance, possess a Charpy notched impact strength greater than about 4 kJ/m$^2$, in some embodiments from about 5 to about 40 kJ/m$^2$, and in some embodiments, from about 6 to about 30 kJ/m$^2$, measured at 23° C. according to ISO Test No. 179-1) (technically equivalent to ASTM D256, Method B). The tensile and flexural mechanical properties of the composition are also good. For example, the thermoplastic composition may exhibit a tensile strength of from about 20 to about 500 MPa, in some embodiments from about 1 to about 400 MPa, and in some embodiments, from about 100 to about 350 MPa; a tensile break strain of about 0.5% or more, in some embodiments from about 0.6% to about 20%, and in some embodiments, from about 0.8% to about 3.5%; and/or a tensile modulus of from about 5,000 MPa to about 30,000 MPa, in some embodiments from about 8,000 MPa to about 20,000 MPa, and in some embodiments, from about 10,000 MPa to about 15,000 MPa. The tensile properties may be determined in accordance with ISO Test No. 527 (technically equivalent to ASTM D638) at 23° C. The thermoplastic composition may also exhibit a flexural strength of from about 20 to about 500 MPa, in some embodiments from about 50 to about 400 MPa, and in some embodiments from about 100 to about 350 MPa; a flexural break strain of about 0.5% or more, in some embodiments from about 0.6% to about 20%, and in some embodiments, from about 0.8% to about 3.5%; and/or a flexural modulus of from about 5,000 MPa to about 30,000 MPa, in some embodiments from about 8,000 MPa to about 20,000 MPa, and in some embodiments, from about 10,000 MPa to about 15,000 MPa. The flexural properties may be determined in accordance with ISO Test No. 178 (technically equivalent to ASTM D790) at 23° C.

In addition to possessing good thermal and mechanical properties, the present inventors have also surprisingly discovered that the composition has improved flame resistance performance, even in the absence of conventional flame retardants. The flame resistance of the composition may, for instance, be determined in accordance the procedure of Underwriter's Laboratory Bulletin 94 entitled "Tests for Flammability of Plastic Materials, UL94". Several ratings can be applied based on the time to extinguish (total flame time) and ability to resist dripping as described in more detail below. According to this procedure, for example, a molded part formed from the composition of the present invention may achieve a V0 rating, which means that the part has a total flame time of 50 seconds or less and a total number of drips of burning particles that ignite cotton of 0, determined at a given part thickness (e.g., 0.25 mm or 0.8 mm). For example, when exposed to an open flame, a molded part formed from the composition of the present invention may exhibit a total flame time of about 50 seconds or less, in some embodiments about 45 seconds or less, and in some embodiments, from about 1 to about 40 seconds. Furthermore, the total number of drips of burning particles produced during the UL94 test may be 3 or less, in some embodiments 2 or less, and in some embodiments, 1 or less (e.g., 0). Such testing may be performed after conditioning for 48 hours at 23° C. and 50% relative humidity.

Various embodiments of the present invention will now be described in more detail.

I. Liquid Crystalline Polymer

The thermotropic liquid crystalline polymer generally has a high degree of crystallinity that enables it to effectively fill the small spaces of a mold. Suitable thermotropic liquid crystalline polymers may include aromatic polyesters, aromatic poly(esteramides), aromatic poly(estercarbonates), aromatic polyamides, etc., and may likewise contain repeating units formed from one or more aromatic hydroxycarboxylic acids, aromatic dicarboxylic acids, aromatic diols, aromatic aminocarboxylic acids, aromatic amines, aromatic diamines, etc., as well as combinations thereof.

Aromatic polyesters, for instance, may be obtained by polymerizing (1) two or more aromatic hydroxycarboxylic acids; (2) at least one aromatic hydroxycarboxylic acid, at least one aromatic dicarboxylic acid, and at least one aromatic diol; and/or (3) at least one aromatic dicarboxylic acid and at least one aromatic diol. Examples of suitable aromatic hydroxycarboxylic acids include, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof. Examples of suitable aromatic dicarboxylic acids include terephthalic acid; isophthalic acid; 2,6-naphthalenedicarboxylic acid; diphenyl ether-4,4'-dicarboxylic acid; 1,6-naphthalenedicarboxylic acid; 2,7-naphthalenedicarboxylic acid; 4,4'-dicarboxybiphenyl; bis(4-carboxyphenyl)ether; bis(4-carboxyphenyl)butane; bis(4-carboxyphenyl)ethane; bis(3-carboxyphenyl)ether; bis(3-carboxyphenyl)ethane, etc., as well as alkyl, alkoxy, aryl and halogen substituents thereof. Examples of suitable aromatic diols include hydroquinone; resorcinol; 2,6-dihydroxynaphthalene; 2,7-dihydroxynaphthalene; 1,6-dihydroxynaphthalene; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof. The synthesis and structure of these and other aromatic polyesters may be described in more detail in U.S. Pat. Nos. 4,161,470; 4,473,682; 4,522,974; 4,375,530; 4,318,841; 4,256,624; 4,219,461; 4,083,829; 4,184,996; 4,279,803; 4,337,190; 4,355,134; 4,429,105; 4,393,191; 4,421,908; 4,434,262; and 5,541,240.

Liquid crystalline polyesteramides may likewise be obtained by polymerizing (1) at least one aromatic hydroxycarboxylic acid and at least one aromatic aminocarboxylic acid; (2) at least one aromatic hydroxycarboxylic acid, at least one aromatic dicarboxylic acid, and at least one aromatic amine and/or diamine optionally having phenolic hydroxy groups; and (3) at least one aromatic dicarboxylic acid and at least one aromatic amine and/or diamine optionally having phenolic hydroxy groups. Suitable aromatic amines and diamines may include, for instance, 3-aminophenol; 4-aminophenol; 1,4-phenylenediamine; 1,3-phenylenediamine, etc., as well as alkyl, alkoxy, aryl and halogen substituents thereof. In one particular embodiment, the aromatic polyesteramide contains monomer units derived from 2,6-hydroxynaphthoic acid, terephthalic acid, and 4-aminophenol. In another embodiment, the aromatic polyesteramide contains monomer units derived from 2,6-hydroxynaphthoic acid, and 4-hydroxybenzoic acid, and 4-aminophenol, as well as other optional monomers (e.g., 4,4'-dihydroxybiphenyl and/or terephthalic acid). The synthesis and structure of these and other aromatic poly(esteramides) may be described in more detail in U.S. Pat. Nos. 4,339,375; 4,355,132; 4,351,917; 4,330,457; 4,351,918; and 5,204,443.

As indicated above, the liquid crystalline polymer is a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 15 mol. %, in some embodiments no more than about 13 mol. %, in some embodiments no more than about 10 mol. %, in some embodiments no more than about 8 mol. %, and in some embodiments, from 0 mol. % to about 5 mol. % of the polymer (e.g., 0 mol. %). Despite the absence of a high level of conventional naphthenic acids, it is believed that the resulting "low naphthenic" polymers are still capable of exhibiting good thermal and mechanical properties, as described above.

In one particular embodiment, for example, a "low naphthenic" aromatic polyester may be formed that contains monomer repeat units derived from 4-hydroxybenzoic acid ("HBA"), terephthalic acid ("TA") and/or isophthalic acid ("IA"); as well as various other optional constituents. The monomer units derived from 4-hydroxybenzoic acid ("HBA") may constitute from about 40 mol. % to about 95 mol. %, in some embodiments from about 45 mol. % to about 90 mol. %, and in some embodiments, from about 50 mol. % to about 80 mol. % of the polymer, while the monomer units derived from terephthalic acid ("TA") and/or isophthalic acid ("IA") may each constitute from about 1 mol. % to about 30 mol. %, in some embodiments from about 2 mol. % to about 25 mol. %, and in some embodiments, from about 3 mol. % to about 20 mol. % of the polymer. Other possible monomer repeat units include aromatic diols, such as 4,4'-biphenol ("BP"), hydroquinone ("HQ"), etc. and aromatic amides, such as acetaminophen ("APAP"). In certain embodiments, for example, BP, HQ, and/or APAP may each constitute from about 1 mol. % to about 30 mol. %, in some embodiments from about 2 mol. % to about 25 mol. %, and in some embodiments, from about 3 mol. % to about 20 mol. % when employed. If desired, the polymer may also contain a small amount of 6-hydroxy-2-naphthoic acid ("HNA") within the ranges noted above.

The liquid crystalline polymers may be prepared by introducing the appropriate monomers) (e.g., aromatic hydroxycarboxylic acid, aromatic dicarboxylic acid, aromatic diol, aromatic amine, aromatic diamine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner, which are incorporated herein in their entirety by reference thereto for all relevant purposes. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as referenced above and known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming an aromatic polyester may include charging precursor monomers (e.g., 4-hydroxybenzoic acid and 2,6-hydroxynaphthoic acid) and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

Regardless of the particular method employed, the resulting liquid crystalline polymer typically may have a high number average molecular weight ($M_n$) of about 2,000 grams per mole or more, in some embodiments from about 4,000 grams per mole or more, and in some embodiments, from about 5,000 to about 30,000 grams per mole. Of course, it is also possible to form polymers having a lower molecular weight, such as less than about 2,000 grams per mole, using the method of the present invention. The intrinsic viscosity of the polymer, which is generally proportional to molecular weight, may also be relatively high. For example, the intrinsic viscosity may be about 4 deciliters per gram ("dL/g") or more, in some embodiments about 5 dL/g or more, in some embodiments from about 6 to about 20 dL/g, and in some embodiments from about 7 to about 15 dL/g. Intrinsic viscosity may be determined in accordance with ISO-1628-5 using a 50/50 (v/v) mixture of pentafluorophenol and hexafluoroisopropanol.

II. Aromatic Carboxylic Acid

As indicated above, the thermoplastic composition of the present invention also contains at least one aromatic carboxylic acid as a flow modifier. Such acids contain one or more carboxyl functional groups that can react with the polymer chain to shorten its length and thus reduce melt viscosity. Without intending to be limited by theory, it is also believed that the acids can combine smaller chains of the polymer together after they have been cut to help maintain the mechanical properties of the composition even after its melt viscosity has been reduced. The aromatic carboxylic acid typically has the general structure provided below in Formula (I):

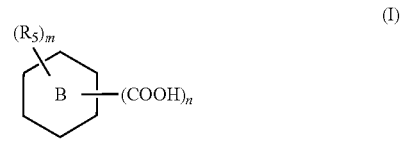

or a metal salt thereof, wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is acyl, acyloxy (e.g., acetyloxy), acylamino (e.g., acetylamino), alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycloxy;

m is from 0 to 4, in some embodiments from 0 to 2, and in some embodiments, from 0 to 1; and n is from 1 to 3, and in some embodiments, from 1 to 2. When the compound is in the form of a metal salt, suitable metal counterions may include transition metal counterions (e.g., copper, iron, etc.), alkali metal counterions (e.g., potassium, sodium, etc.), alkaline earth metal counterions (e.g., calcium, magnesium, etc.), and/or main group metal counterions (e.g., aluminum).

In one embodiment, for example, B is phenyl in Formula (I) such that the aromatic carboxylic acid has the following formula (II):

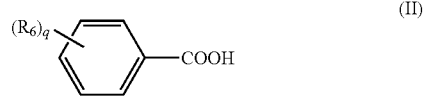

or a metal salt thereof, wherein,

R$_6$ is acyl, acyloxy, acylamino, alkoxy, alkenyl, alkyl, amino, carboxyl, carboxyl ester, hydroxyl, halo, or haloalkyl; and q is from 0 to 4, in some embodiments from 0 to 2, and in some embodiments, from 0 to 1. Particular examples of such phenolic acids include, for instance, benzoic acid (q is 0); 4-hydroxybenzoic acid (R$_6$ is OH and q is 1); phthalic acid (R$_6$ is COON and q is 1); isophthalic acid (R$_6$ is COOH and q is 1); terephthalic acid (R$_6$ is COON and q is 1); 2-methyl-terephthalic acid (R$_6$ is COON and CH$_3$ and q is 2), etc., as well as combinations thereof.

In another embodiment, B is phenyl and R$_5$ is phenyl in Formula (I) above such that the aromatic carboxylic acid has the following formula (III):

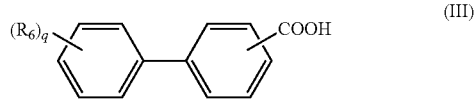

(III)

or a metal salt thereof, wherein,

R$_6$ is acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycloxy; and q is from 0 to 4, in some embodiments from 0 to 2, and in some embodiments, from 0 to 1. Particular examples of such diphenolic acids include, for instance, 4-hydroxy-4'-biphenylcarboxylic acid (R$_6$ is OH and q is 1); 4'-hydroxyphenyl-4-benzoic acid (R$_6$ is OH and q is 1); 3'-hydroxyphenyl-4-benzoic acid (R$_6$ is OH and q is 1); 4'-hydroxyphenyl-3-benzoic acid (R$_6$ is OH and q is 1); 4,4'-bibenzoic acid (R$_6$ is COON and q is 1); etc., as well as combinations thereof.

In yet another embodiment, B is naphthenyl in Formula (I) above such that the aromatic carboxylic acid has the following formula (IV):

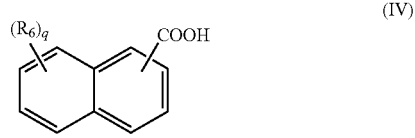

(IV)

or a metal salt thereof, wherein,

R$_6$ is acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycloxy; and q is from 0 to 4, in some embodiments from 0 to 2, and in some embodiments, from 0 to 1. Particular examples of such naphthenic acids include, for instance, 1-naphthoic acid (q is 0); 2-naphthoic acid (q is 0); 2-hydroxy-6-naphthoic acid (R$_6$ is OH and q is 1); 2-hydroxy-5-naphthoic acid (R$_6$ is OH and q is 1); 3-hydroxy-2-naphthoic acid (R$_6$ is OH and q is 1); 2-hydroxy-3-naphthoic acid (R$_6$ is OH and q is 1); 2,6-naphthalenedicarboxylic acid (R$_6$ is COOH and q is 1); 2,3-naphthalenedicarboxylic acid (R$_6$ is COOH and q is 1), etc., as well as combinations thereof.

The relative concentration of aromatic carboxylic acids may be selected to achieve the desired melt viscosity. Surprisingly, the present inventors have discovered that relatively high concentrations can improve both the melt viscosity and flammability performance without having a significant impact on mechanical strength. In this regard, aromatic carboxylic acids typically constitute from about 1 wt. % to about 10 wt. %, in some embodiments from about 1.5 wt. % to about 8 wt. %, and in some embodiments, from about 1.8 wt. % to about 3 wt. % of the thermoplastic composition. Depending whether or not other additives are also present, as described below, liquid crystalline polymers may likewise constitute anywhere from about 10 wt. % to about 99 wt. %. In most embodiments, however, liquid crystalline polymers constitute from about 20 wt. % to about 90 wt %, in some embodiments from about 30 wt. % to about 80 wt. %, and in some embodiments, from about 40 wt. % to about 75 wt. % of the thermoplastic composition. The weight ratio of liquid crystalline polymers to aromatic carboxylic acids may likewise range from about 10 to about 60, in some embodiments from about 20 to about 50, and in some embodiments, from about 25 to about 45.

III. Optional Components

A. Other Flow Aids

While the composition of the present invention has a low melt viscosity, it is nevertheless possible to include other optional flow aids if so desired. One example of an optional flow aid is a hydroxy-functional compound. When employed, hydroxy-functional compounds may constitute from about 0.05 wt. % to about 4 wt %, in some embodiments from about 0.1 wt. % to about 2 wt. %, and in some embodiments, from about 0.2 wt. % to about 1 wt. % of the thermoplastic composition. The weight ratio of hydroxy-functional compounds to the aromatic carboxylic acids in the composition may also be from about 1 to about 30, in some embodiments from about 2 to about 25, and in some embodiments, from about 5 to about 20.

One example of a suitable hydroxyl-functional compound is an aromatic dial, such as hydroquinone, resorcinol, 4,4'-biphenol, etc., as well as combinations thereof. When employed, such aromatic diols may constitute from about 0.01 wt. % to about 1 wt. %, and in some embodiments, from about 0.05 wt. % to about 0.4 wt. % of the thermoplastic composition. Water is also a suitable hydroxy-functional compound, and can be used alone or in combination with other hydroxy-functional compounds. If desired, water can be added in a form that under process conditions generates water. For example, the water can be added as a hydrate that under the process conditions (e.g., high temperature) effectively "loses" water. Such hydrates include alumina trihydrate, copper sulfate pentahydrate, barium chloride dihydrate, calcium sulfate dihydrate, etc., as well as combinations thereof. When employed, the hydrates may constitute from about 0.02 wt. % to about 2 wt. %, and in some embodiments, from about 0.05 wt. % to about 1 wt. % of the thermoplastic composition. In one particular embodiment, a mixture of an aromatic dial and hydrate are employed as hydroxy-functional compounds in the composition. Typically, the weight ratio of hydrates to aromatic diols in the mixture is from about 0.5 to about 8, in some embodiments from about 0.8 to about 5, and in some embodiments, from about 1 to about 5.

B. Fillers

Various fillers may also be incorporated in the thermoplastic composition if desired. For example, fibers may be employed in the thermoplastic composition to improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in electronic components, the high strength fibers may be formed from materials that are also generally insulative in nature, such as glass, ceramics (e.g., alumina or silica), aramids (e.g., Kevlar® marketed by E. I. duPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The volume average length of the fibers may be from about 1 to about 400 micrometers, in some embodiments from about 80 to about 250 micrometers, in some embodiments from about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 1 to about 400 micrometers, in some embodiments from about 80 to about 250 micrometers, in some embodiments from about 100 to about 200 micrometers, and in some embodiments, from about 110 to about 180 micrometers. Such a weight average length and narrow length distribution can further help achieve a desirable combination of strength and flowability, which enables it to be uniquely suited for molded parts with a small dimensional tolerance.

In addition to possessing the length characteristics noted above, the fibers may also have a relatively high aspect ratio (average length divided by nominal diameter) to help improve the mechanical properties of the resulting thermoplastic composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 10 to about 35 micrometers, and in some embodiments, from about 15 to about 30 micrometers.

The relative amount of the fibers in the thermoplastic composition may also be selectively controlled to help achieve the desired mechanical properties without adversely impacting other properties of the composition, such as its flowability. For example, the fibers typically constitute from about 2 wt. % to about 40 wt. %, in some embodiments from about 5 wt. % to about 35 wt. %, and in some embodiments, from about 6 wt. % to about 30 wt. % of the thermoplastic composition. Although the fibers may be employed within the ranges noted above, one particularly beneficial and surprising aspect of the present invention is that small fiber contents may be employed while still achieving the desired mechanical properties. Without intending to be limited by theory, it is believed that the narrow length distribution of the fibers can help achieve excellent mechanical properties, thus allowing for the use of a smaller amount of fibers. For example, the fibers can be employed in small amounts such as from about 2 wt. % to about 20 wt. %, in some embodiments from about 5 wt. % to about 16 wt. %, and in some embodiments, from about 6 wt. % to about 12 wt. %.

C. Other Additives

Still other additives that can be included in the composition may include, for instance, antimicrobials, fillers, pigments, antioxidants, stabilizers, surfactants, waxes, solid solvents, flame retardants, anti-drip additives, and other materials added to enhance properties and processability. For example, mineral fillers may be employed in the thermoplastic composition to help achieve the desired mechanical properties and/or appearance. When employed, such mineral fillers typically constitute from about 1 wt. % to about 40 wt. %, in some embodiments from about 2 wt. % to about 35 wt. %, and in some embodiments, from about 5 wt. % to about 30 wt. % of the thermoplastic composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,FO_2$ ($Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Ai)_4O_{10}(OH)_2$), etc., as well as combinations thereof.

Lubricants may also be employed in the thermoplastic composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecanoic acid, parinaric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are esters, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the thermoplastic composition.

IV. Formation of Composition

The liquid crystalline polymer, aromatic carboxylic acid, and other optional additives may be melt blended together within a temperature range of from about 200° C. to about 450° C., in some embodiments, from about 220° C. to about 400° C., and in some embodiments, from about 250° C. to about 350° C. to form the thermoplastic composition. Any of a variety of melt blending techniques may generally be employed in the present invention. For example, the components (e.g., liquid crystalline polymer, aromatic carboxylic acid, etc.) may be supplied separately or in combination to an extruder that includes at least one screw rotatably mounted and received within a barrel (e.g., cylindrical barrel) and may define a feed section and a melting section located downstream from the feed section along the length of the screw.

Figure 3:
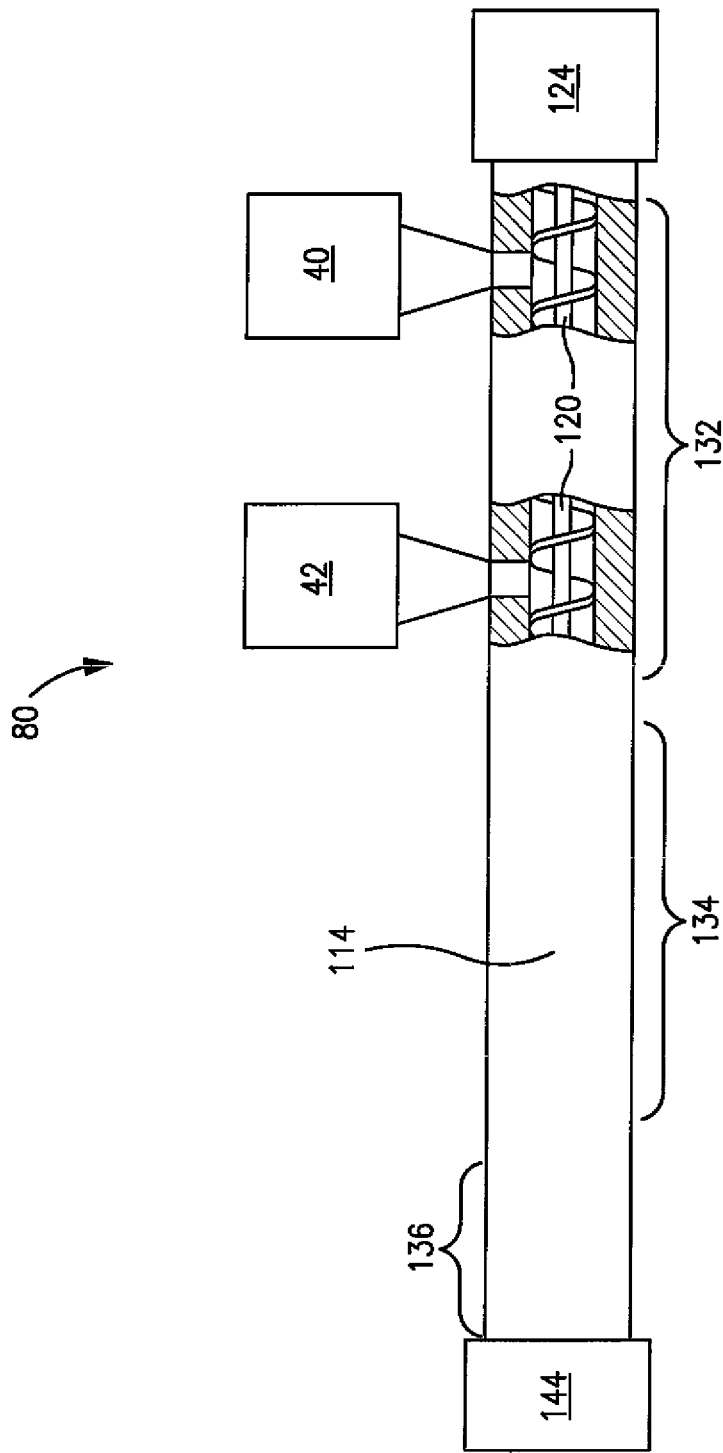
FIG. 3 is a schematic illustration of one embodiment of an extruder screw that may be used to form the thermoplastic composition of the present invention.

The extruder may be a single screw or twin screw extruder. Referring to FIG. 3, for example, one embodiment of a single screw extruder 80 is shown that contains a housing or barrel 114 and a screw 120 rotatably driven on one end by a suitable drive 124 (typically including a motor and gearbox). If desired, a twin-screw extruder may be employed that contains two separate screws. The configuration of the screw is not particularly critical to the present invention and it may contain any number and/or orientation of threads and channels as is known in the art. As shown in FIG. 3, for example, the screw 120 contains a thread that forms a generally helical channel radially extending around a core of the screw 120. A hopper 40 is located adjacent to the drive 124 for supplying the liquid crystalline polymer and/or other materials (e.g., aromatic carboxylic acids) through an opening in the barrel 114 to the feed section 132. Opposite the drive 124 is the output end 144 of the extruder 80, where extruded plastic is output for further processing.

A feed section 132 and melt section 134 are defined along the length of the screw 120. The feed section 132 is the input portion of the barrel 114 where the liquid crystalline polymer and/or aromatic carboxylic acids are added. The melt section 134 is the phase change section in which the liquid crystalline polymer is changed from a solid to a liquid. While there is no precisely defined delineation of these sections when the extruder is manufactured, it is well within the ordinary skill of those in this art to reliably identify the feed section 132 and the melt section 134 in which phase change from solid to liquid is occurring. Although not necessarily required, the extruder 80 may also have a mixing section 136 that is located adjacent to the output end of the barrel 114 and downstream from the melting section 134. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

When employed, fibers can also be added to the hopper 40 or at a location downstream therefrom. In one particular embodiment, fibers may be added a location downstream from the point at which the liquid crystalline polymer is supplied, but yet prior to the melting section. In FIG. 3, for instance, a hopper 42 is shown that is located within a zone of the feed section 132 of the extruder 80. The fibers supplied to the hopper 42 may be initially relatively long, such as having a volume average length of from about 1,000 to about 5,000 micrometers, in some embodiments from about 2,000 to about 4,500 micrometers, and in some embodiments, from about 3,000 to about 4,000 micrometers. Nevertheless, by supplying these long fibers at a location where the liquid crystalline polymer is still in a solid state, the polymer can act as an abrasive agent for reducing the size of the fibers to a volume average length and length distribution as indicated above.

If desired, the ratio of the length ("L") to diameter ("D") of the screw may be selected to achieve an optimum balance between throughput and fiber length reduction. The L/D value may, for instance, range from about 15 to about 50, in some embodiments from about 20 to about 45, and in some embodiments from about 25 to about 40. The length of the screw may, for instance, range from about 0.1 to about 5 meters, in some embodiments from about 0.4 to about 4 meters, and in some embodiments, from about 0.5 to about 2 meters. The diameter of the screw may likewise be from about 5 to about 150 millimeters, in some embodiments from about 10 to about 120 millimeters, and in some embodiments, from about 20 to about 80 millimeters. The L/D ratio of the screw after the point at which the fibers are supplied may also be controlled within a certain range. For example, the screw has a blending length ("$L_B$") that is defined from the point at which the fibers are supplied to the extruder to the end of the screw, the blending length being less than the total length of the screw. As noted above, it may be desirable to add the fibers before the liquid crystalline polymer is melted, which means that the $L_B$/D ratio would be relatively high. However, too high of a $L_B$/D ratio could result in degradation of the polymer. Therefore, the $L_B$/D ratio of the screw after the point at which the fibers are supplied is typically from about 4 to about 20, in some embodiments from about 5 to about 15, and in some embodiments, from about 6 to about 10.

In addition to the length and diameter, other aspects of the extruder may also be selected to help achieve the desired fiber length. For example, the speed of the screw may be selected to achieve the desired residence time, shear rate, melt processing temperature, etc. Generally, an increase in frictional energy results from the shear exerted by the turning screw on the materials within the extruder and results in the fracturing of the fibers, if employed. The degree of fracturing may depend, at least in part, on the screw speed. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

In the embodiments described above, the length of the fibers is reduced within the extruder. It should be understood, however, that this is by no means a requirement of the present invention. For example, the fibers may simply be supplied to the extruder at the desired length. In such embodiments, the fibers may, for example, be supplied at the mixing and/or melting sections of the extruder, or even at the feed section in conjunction with the liquid crystalline polymer. In yet other embodiments, fibers may not be employed at all.

V. Molded Parts

Once formed, the thermoplastic composition may be molded into any of a variety of different shaped parts using techniques as is known in the art. For example, the shaped parts may be molded using a one-component injection molding process in which dried and preheated plastic granules are injected into the mold. Regardless of the molding technique employed, it has been discovered that the thermoplastic composition of the present invention, which possesses the unique combination of high flowability and good mechanical properties, is particularly well suited for parts having a small dimensional tolerance. Such parts, for example, generally contain at least one micro-sized dimension (e.g., thickness, width, height, etc.), such as from about 500 micrometers or less, in some embodiments from about 50 to about 450 micrometers, and in some embodiments, from about 100 to about 400 micrometers.

One such part is a fine pitch electrical connector. More particularly, such electrical connectors are often employed to detachably mount a central processing unit ("CPU") to a printed circuit board. The connector may contain insertion passageways that are configured to receive contact pins. These passageways are defined by opposing walls, which may be formed from a thermoplastic resin. To help accomplish the desired electrical performance, the pitch of these pins is generally small to accommodate a large number of contact pins required within a given space. This, in turn, requires that the pitch of the pin insertion passageways and the width of opposing walls that partition those passageways are also small. For example, the walls may have a width of from about 500 micrometers or less, in some embodiments from about 50 to about 450 micrometers, and in some embodiments, from about 100 to about 400 micrometers. In the past, it has often been difficult to adequately fill a mold of such a thin width with a thermoplastic resin. Due to its unique properties, however, the thermoplastic composition of the present invention is particularly well suited to form the walls of a fine pitch connector.

One particularly suitable fine pitch electrical connector is shown in FIG. 1. An electrical connector 200 is shown that a board-side portion C2 that can be mounted onto the surface of a circuit board P. The connector 200 may also include a wiring material-side portion C1 structured to connect discrete wires 3 to the circuit board P by being coupled to the board-side connector C2. The board-side portion C2 may include a first housing 10 that has a fitting recess 10*a* into which the wiring material-side connector C1 is fitted and a configuration that is slim and long in the widthwise direction of the housing 10. The wiring material-side portion C1 may likewise include a second housing 20 that is slim and long in the widthwise direction of the housing 20. In the second housing 20, a plurality of terminal-receiving cavities 22 may be provided in parallel in the widthwise direction so as to create a two-tier array including upper and lower terminal-receiving cavities 22. A terminal 5, which is mounted to the distal end of a discrete wire 3, may be received within each of the terminal-receiving cavities 22. If desired, locking portions 28 (engaging portions) may also be provided on the housing 20 that correspond to a connection member (not shown) on the board-side connector C2.

Figure 2:
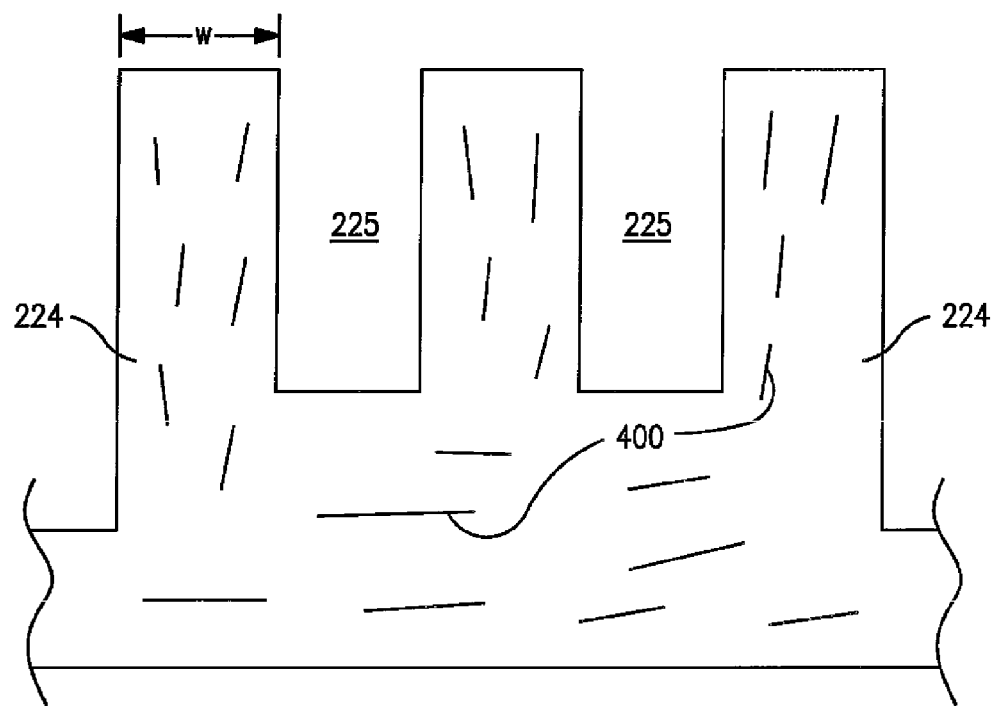
FIG. 2 is a front view of opposing walls of the fine pitch electrical connector of FIG. 1.

As discussed above, the interior walls of the first housing 10 and/or second housing 20 may have a relatively small width dimension, and can be formed from the thermoplastic composition of the present invention. The walls are, for example, shown in more detail in FIG. 2. As illustrated, insertion passageways or spaces 225 are defined between opposing walls 224 that can accommodate contact pins. The walls 224 have a width "w" that is within the ranges noted above. When the walls 224 are formed from a thermoplastic composition containing fibers (e.g., element 400), such fibers may have a volume average length and narrow length distribution within a certain range to best match the width of the walls. For example, the ratio of the width of at least one of the walls to the volume average length of the fibers is from about 0.8 to about 3.2, in some embodiments from about 1.0 to about 3.0, and in some embodiments, from about 1.2 to about 2.9.

In addition to or in lieu of the walls, it should also be understood that any other portion of the housing may also be formed from the thermoplastic composition of the present invention. For example, the connector may also include a shield that encloses the housing. Some or all of the shield may be formed from the thermoplastic composition of the present invention. For example, the housing and the shield can each be a one-piece structure unitarily molded from the thermoplastic composition. Likewise, the shield can be a two-piece structure that includes a first shell and a second shell, each of which may be formed from the thermoplastic composition of the present invention.

Of course, the thermoplastic composition may also be used in a wide variety of other components having a small dimensional tolerance. For example, the thermoplastic composition may be molded into a planar substrate for use in an electronic component. The substrate may be thin, such as having a thickness of about 500 micrometers or less, in some embodiments from about 50 to about 450 micrometers, and in some embodiments, from about 100 to about 400 micrometers. Examples of electronic components that may employ such a substrate include, for instance, cellular telephones, laptop computers, small portable computers (e.g., ultraportable computers, netbook computers, and tablet computers), wristwatch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, integrated circuits (e.g., SIM cards), etc.

In one embodiment, for example, the planar substrate may be applied with one or more conductive elements using a variety of known techniques (e.g., laser direct structuring, electroplating, etc.). The conductive elements may serve a variety of different purposes. In one embodiment, for example, the conductive elements form an integrated circuit, such as those used in SIM cards. In another embodiment, the conductive elements form antennas of a variety of different types, such as antennae with resonating elements that are formed from patch antenna structures, inverted-F antenna structures, closed and open slot antenna structures, loop antenna structures, monopoles, dipoles, planar inverted-F antenna structures, hybrids of these designs, etc. The resulting antenna structures may be incorporated into the housing of a relatively compact portable electronic component, such as described above, in which the available interior space is relatively small.

Figure 4:
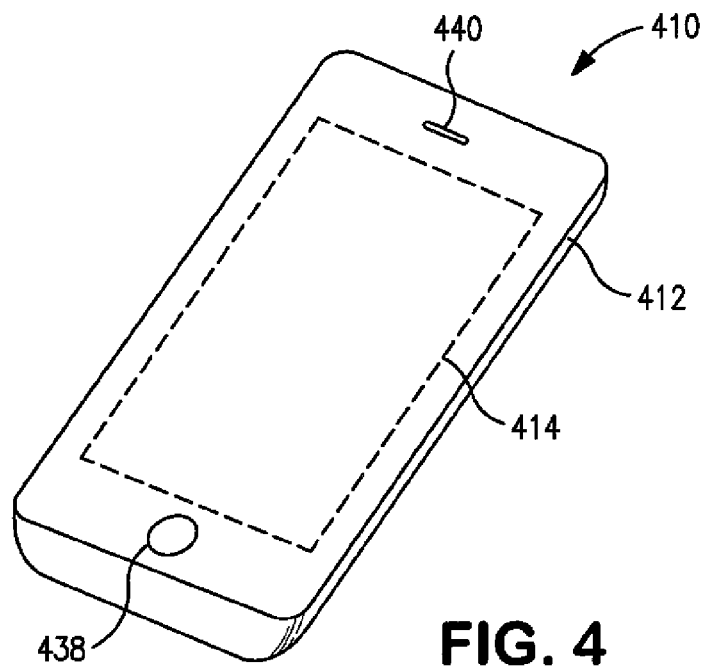
FIGS. 4-5 are respective front and rear perspective views of an electronic component that can employ an antenna structure formed in accordance with one embodiment of the present invention.
Figure 5:
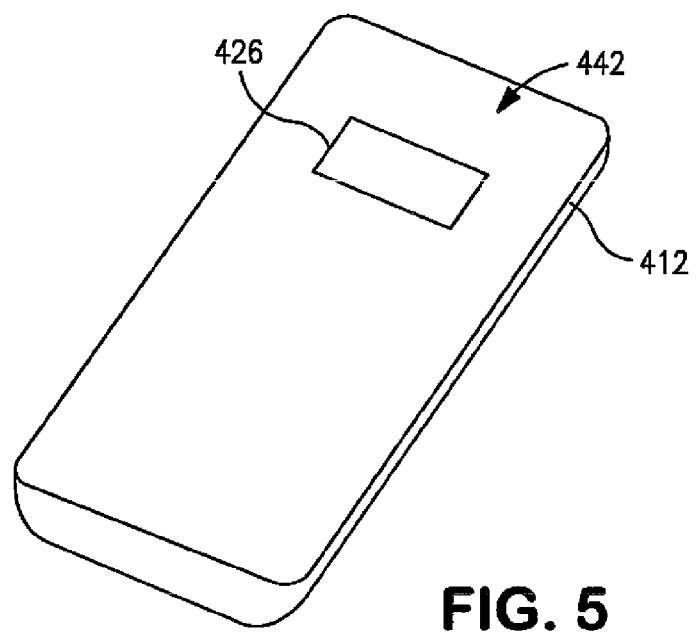

One particularly suitable electronic component that includes an antenna structure is shown in FIGS. 4-5 is a handheld device 410 with cellular telephone capabilities. As shown in FIG. 4, the device 410 may have a housing 412 formed from plastic, metal, other suitable dielectric materials, other suitable conductive materials, or combinations of such materials. A display 414 may be provided on a front surface of the device 410, such as a touch screen display. The device 410 may also have a speaker port 440 and other input-output ports. One or more buttons 438 and other user input devices may be used to gather user input. As shown in FIG. 5, an antenna structure 426 is also provided on a rear surface 442 of device 410, although it should be understood that the antenna structure can generally be positioned at any desired location of the device. As indicated above, the antenna structure 426 may contain a planar substrate that is formed from the thermoplastic composition of the present invention. The antenna structure may be electrically connected to other components within the electronic device using any of a variety of known techniques. For example, the housing 412 or a part of housing 412 may serve as a conductive ground plane for the antenna structure 426.

Figure 6:
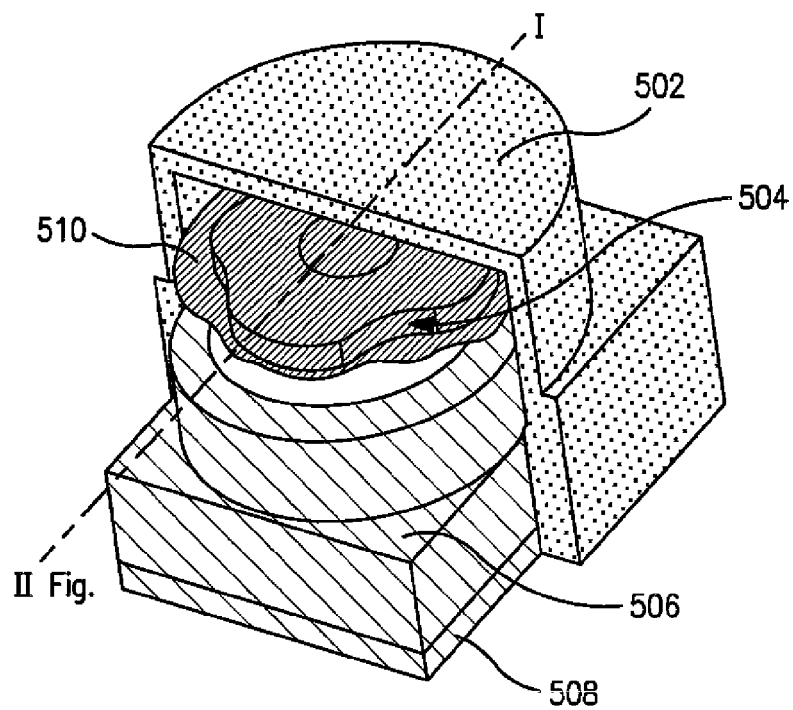
FIGS. 6-7 are perspective and front views of a compact camera module ("CCM") that may be formed in accordance with one embodiment of the present invention.
Figure 7:
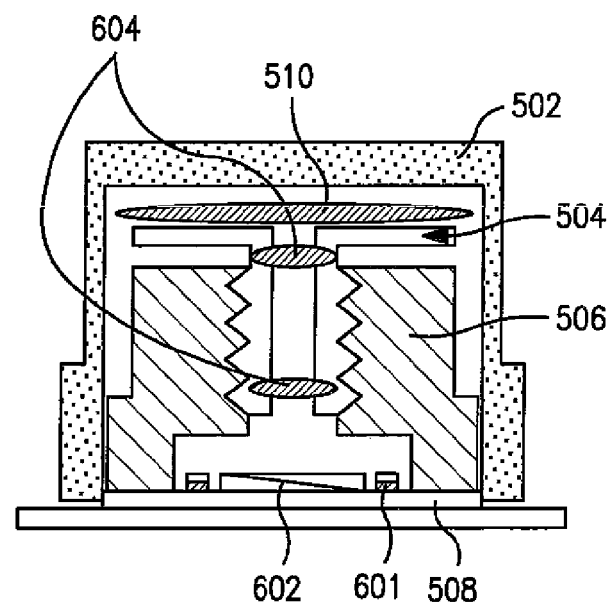

A planar substrate that is formed form the thermoplastic composition of the present invention may also be employed in other applications. For example, in one embodiment, the planar substrate may be used to form a base of a compact camera module ("CCM"), which is commonly employed in wireless communication devices (e.g., cellular phone). Referring to FIGS. 6-7, for example, one particular embodiment of a compact camera module 500 is shown in more detail. As shown, the compact camera module 500 contains a lens assembly 504 that overlies a base 506. The base 506, in turn, overlies an optional main board 508. Due to their relatively thin nature, the base 506 and/or main board 508 are particularly suited to be formed from the thermoplastic composition of the present invention as described above. The lens assembly 504 may have any of a variety of configurations as is known in the art, and may include fixed focus-type lenses and/or auto focus-type lenses. In one embodiment, for example, the lens assembly 504 is in the form of a hollow barrel that houses lenses 604, which are in communication with an image sensor 602 positioned on the main board 508 and controlled by a circuit 601. The barrel may have any of a variety of shapes, such as rectangular, cylindrical, etc. In certain embodiments, the barrel may also be formed from the thermoplastic composition of the present invention and have a wall thickness within the ranges noted above. It should be understood that other parts of the camera module may also be formed from the thermoplastic composition of the present invention. For example, as shown, a polymer film 510 (e.g., polyester film) and/or thermal insulating cap 502 may cover the lens assembly 504. In some embodiments, the film 510 and/or cap 502 may also be formed from the thermoplastic composition of the present invention.

Printer parts may also contain the thermoplastic composition of the present invention. Examples of such parts may include, for instance, printer cartridges, separation claws, heater holders, etc. For example, the composition may be used to form an ink jet printer or a component of an inkjet printer. In one particular embodiment, for instance, the ink cartridge may contain a rigid outer housing having a pair of spaced cover plates affixed to a peripheral wall section. In one embodiment, the cover plates and/or the wall section may be formed from the composition of the present invention.

The present invention may be better understood with reference to the following examples.

Test Methods

UL94: A specimen is supported in a vertical position and a flame is applied to the bottom of the specimen. The flame is applied for ten (10) seconds and then removed until flaming stops, at which time the flame is reapplied for another ten (10) seconds and then removed. Two (2) sets of five (5) specimens are tested. The sample size is a length of 125 mm, width of 13 mm, and thickness of 0.8 mm. The two sets are conditioned before and after aging. For unaged testing, each thickness is tested after conditioning for 48 hours at 23° C. and 50% relative humidity. For aged testing, five (5) samples of each thickness are tested after conditioning for 7 days at 70° C.

| Vertical Ratings | Requirements |
|---|---|
| V-0 | Specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame. |
| V-1 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens must not drip flaming particles that ignite the cotton. No specimen can have glowing combustion remain for longer than 60 seconds after removal of the test flame. |
| V-2 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens can drip flaming particles that ignite the cotton. No specimen can have glowing combustion remain for longer than 60 seconds after removal of the test flame. |

Melt Viscosity:

The melt viscosity (Pa-s) may be determined in accordance with ISO Test No. 11443 at a shear rate of 1000 s$^{-1}$ and temperature 15° C. above the melting temperature (e.g., 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature:

The melting temperature ("Tm") was determined by differential scanning calorimetry ("DSC") as is known in the art. The melting temperature is the differential scanning calorimetry (DSC) peak melt temperature as determined by ISO Test No. 11357. Under the DSC procedure, samples were heated and cooled at 20° C. per minute as stated in ISO Standard 10350 using DSC measurements conducted on a TA Q2000 Instrument.

Deflection Temperature Under Load ("DTUL"):

The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature was raised at 2° C. per minute until it deflects 0.25 mm (0.32 mm for ISO Test No. 75-2).

Tensile Modulus, Tensile Stress, and Tensile Elongation:

Tensile properties are tested according to ISO Test No. 527 (technically equivalent to ASTM D638). Modulus and strength measurements are made on the same test strip sample having a length of 80 mm, thickness of 10 mm, and width of 4 mm. The testing temperature is 23° C., and the testing speeds are 1 or 5 mm/min.

Flexural Modulus, Flexural Stress, and Flexural Strain:

Flexural properties are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Notched Charpy Impact Strength:

Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C.

Blister Free Temperature:

To test blister resistance, a 127×12.7×0.8 mm test bar is molded at 5° C. to 10° C. higher than the melting temperature of the polymer resin, as determined by DSC. Ten (10) bars are immersed in a silicone oil at a given temperature for 3 minutes, subsequently removed, cooled to ambient conditions, and then inspected for blisters (i.e., surface deformations) that may have formed. The test temperature of the silicone oil begins at 250° C. and is increased at 10° C. increments until a blister is observed on one or more of the test bars. The "blister free temperature" for a tested material is defined as the highest temperature at which all ten (10) bars tested exhibit no blisters. A higher blister free temperature suggests a higher degree of heat resistance.

EXAMPLE 1

A sample (Sample 1) is formed from 98 wt. % of a liquid crystalline polymer and 2 wt. % 2,6-naphthalene dicarboxylic acid ("NDA"). A second sample (Sample 2) is likewise formed from 99.5 wt. % of a liquid crystalline polymer and 0.5 wt. % NDA. In addition to Sample 1 and Sample 2, a control sample (Control Sample 1) is also formed from 100 wt. % of a liquid crystalline polymer. The liquid crystalline polymer in each of the samples is formed from 4-hydroxybenzoic acid ("HBA"), 2,6-hydroxynaphthoic acid ("HNA"), terephthalic acid ("TA"), 4,4'-biphenol ("BP"), and acetaminophen ("APAP"), such as described in U.S. Pat. No. 5,508,374 to Lee, et al. HNA is employed in the polymer in an amount of 5 mol. %. To form the thermoplastic composition, pellets of the liquid crystalline polymer are dried at 150° C. overnight. Thereafter, the polymer and Glycolube™ P are supplied to the feed throat of a ZSK-25 WLE co-rotating, fully intermeshing twin screw extruder in which the length of the screw is 750 millimeters, the diameter of the screw is 25 millimeters, and the UD ratio is 30. The extruder has Temperature Zones 1-9, which may be set to the following temperatures: 330° C., 330° C., 310° C., 310° C., 310° C., 310° C., 320° C., 320° C., and 320° C., respectively. The polymer and NDA are supplied to the feed throat by means of a volumetric feeder. Once melt blended, the samples are extruded through a single-hole strand die, cooled through a water bath, and pelletized.

Parts are injection molded from Samples 1-2 and Control Sample 1 and tested for their thermal and mechanical properties. The results are set forth below in Table 1.

TABLE 1

|  | Sample 1 | Sample 2 | Control Sample 1 |
| --- | --- | --- | --- |
| Melt Viscosity at 1000 s$^{-1}$ and 350° C. (Pa-s) | 1.8 | 7.2 | 18.9 |
| Melt Viscosity at 400 s$^{-1}$ and 350° C. (Pa-s) | 2.0 | 8.5 | 23.4 |
| DTUL @ 1.8 Mpa (° C.) | 231.8 | 210.4 | 240.4 |
| Ten. Brk stress (MPa) | 124 | — | 150 |
| Ten. Modulus (MPa) | 9,773 | 6,586 | 12,543 |
| Ten. Brk strain (%) | 1.9 | — | 1.7 |
| Flex Brk stress (MPa) | 134 | 124 | 169 |
| Flex modulus (MPa) | 10,474 | 6,120 | 11,963 |
| Flex Brk strain (%) | 2.6 | 4.1 | 3.4 |
| Charpy Notched (KJ/m$^2$) | 53.7 | 18.2 | 87.8 |

EXAMPLE 2

A sample (Sample 3) is formed from 99.5 wt. % of a liquid crystalline polymer and 0.5 wt. % NDA. A control sample (Control Sample 2) is also formed from 100 wt. % of a liquid crystalline polymer. The liquid crystalline polymer in each of the samples is formed from HBA, HNA, TA, BP, and APAP, such as described in U.S. Pat. No. 5,508,374 to Lee, et al. HNA is employed in the polymer in an amount of 0 mol. %. Parts are injection molded from Sample 3 and Control Sample 2 and tested for their thermal and mechanical properties. The results are set forth below in Table 2.

TABLE 2

|  | Sample 3 | Control Sample 2 |
| --- | --- | --- |
| Melt Viscosity at 1000 s$^{-1}$ and 350° C. (Pa-s) | 6.7 | 14.6 |
| Melt Viscosity at 400 s$^{-1}$ and 350° C. (Pa-s) | 7.7 | 17.5 |
| DTUL @ 1.8 Mpa (° C.) | 225.6 | 230.9 |
| Ten. Brk stress (MPa) | 164 | 183 |
| Ten. Modulus (MPa) | 14,955 | 17,042 |
| Ten. Brk strain (%) | 2.2 | 2.7 |
| Flex Brk stress (MPa) | 127 | 173 |
| Flex modulus (MPa) | 18,223 | 18,787 |
| Flex Brk strain (%) | 0.9 | 1.3 |
| Charpy Notched (KJ/m$^2$) | 29.4 | 47.8 |

EXAMPLE 3

A sample (Sample 4) is formed from 99.5 wt. % of a liquid crystalline polymer and 0.5 wt. % NDA. A second sample (Sample 5) is formed in the same manner as Sample 4, except that NDA constitutes 1 wt. % of the composition. A control sample (Control Sample 3) is also formed from 100 wt. % of a liquid crystalline polymer. The liquid crystalline polymer in each of the samples is formed from HBA, HNA, TA, BP, and APAP, such as described in U.S. Pat. No. 5,508,374 to Lee, et al. HNA is employed in the polymer in an amount of 12.5 mol. %. Parts are injection molded from Samples 4-5 and Control Sample 3 and tested for their thermal and mechanical properties. The results are set forth below in Table 3

TABLE 3

|  | Sample 4 | Sample 5 | Control Sample 3 |
|---|---|---|---|
| Melt Viscosity at 1000 s$^{-1}$ and 350° C. (Pa-s) | 5.0 | 2.1 | 9.9 |
| Melt Viscosity at 400 s$^{-1}$ and 350° C. (Pa-s) | 5.1 | 2.9 | 11.5 |
| DTUL @ 1.8 Mpa (° C.) | 248.5 | 242.3 | 243.2 |
| Ten. Brk stress (MPa) | 161 | 150 | 180 |
| Ten. Modulus (MPa) | 12,680 | 11,857 | 12,876 |
| Ten. Brk strain (%) | 2.2 | 2.2 | 2.9 |
| Flex Brk stress (MPa) | 133 | 133 | 138 |
| Flex modulus (MPa) | 13,620 | 11,911 | 14,772 |
| Flex Brk strain (%) | 1.3 | 1.5 | 1.2 |
| Charpy Notched (KJ/m$^2$) | 40.3 | 29.3 | 62.7 |

EXAMPLE 4

A sample (Sample 6) is formed from 61.7 wt. % of a liquid crystalline polymer, 18 wt. % glass fibers, 18 wt. % talc, 0.3 wt. % Glycolube™ P, and 2 wt. % NDA. A control sample (Control Sample 4) is also formed from 63.7 wt. % of a liquid crystalline polymer, 18 wt. % glass fibers, 18 wt. % talc, and 0.3 wt. % Glycolube™ P. The liquid crystalline polymer in each of the samples is formed from HBA, HNA, TA, BP, and APAP, such as described in U.S. Pat. No. 5,508,374 to Lee, et al. HNA is employed in the polymer in an amount of 5 mol. %. The glass fibers are obtained from Owens Corning and have an initial length of 4 millimeters. Parts having a thickness of 0.8 mm are injection molded from Sample 6 and Control Sample 4 and tested for their thermal and mechanical properties. The results are set forth below in Table 4.

TABLE 4

|  | Sample 6 | Control Sample 4 |
|---|---|---|
| Melt Viscosity at 1000 s$^{-1}$ and 350° C. (Pa-s) | 10 | 36 |
| Melt Viscosity at 400 s$^{-1}$ and 350° C. (Pa-s) | 14 | 50 |
| DTUL @ 1.8 Mpa (° C.) | 234 | 232 |
| Ten. Brk stress (MPa) | 116 | 117 |
| Ten. Modulus (MPa) | 10,543 | 11,392 |
| Ten. Brk strain (%) | 3.1 | 2.6 |
| Flex Brk stress (MPa) | 136 | 138 |
| Flex modulus (MPa) | 11,412 | 11,767 |
| Flex Brk strain (%) | 2.6 | 2.5 |
| Charpy Notched (KJ/m$^2$) | 21 | 14 |
| Blister Free Temperature (° C.) | 270 | 260 |

In addition, Sample 6 and Control Sample 4 are also subjected to UL94 testing for flame resistance, before and after aging. The results are set forth below in Table 5.

TABLE 5

|  | Sample 6 | | Control Sample 4 | |
|---|---|---|---|---|
|  | Before Aging | After Aging | Before Aging | After Aging |
| Total flame time (s) | 36 | 20 | 48 | 39 |
| Number of drips (without igniting) | 0 | 0 | 2 | 2 |
| Number of drips (igniting) | 0 | 0 | 2 | 0 |
| Total number of drips | 0 | 0 | 4 | 2 |
| UL94 Rating | V0 | V0 | V2 | V0 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A thermoplastic composition that comprises at least one thermotropic liquid crystalline polymer, wherein the total amount of repeating units in the thermotropic liquid crystalline polymer derived from naphthenic hydroxycarboxylic and/or naphthenic dicarboxylic acids is no more than 15 mol. %, the thermoplastic composition further comprising at least one aromatic carboxylic acid, and further wherein the thermoplastic composition has a melt viscosity of from about 0.1 to about 80 Pa-s, as determined in accordance with ISO Test No. 11443 at a shear rate of 1000 seconds$^{-1}$ and temperature that is 15° C. above the melting temperature of the thermoplastic composition.

2. The thermoplastic composition of claim 1, wherein the aromatic carboxylic acid is a phenolic acid, diphenolic acid, naphthenic acid, or a combination thereof.

3. The thermoplastic composition of claim 1, wherein the aromatic carboxylic acid includes 4-hydroxybenzoic acid, phthalic acid, isophthalic acid, terephthalic acid, 2-methyl-terephthalic acid, or a combination thereof.

4. The thermoplastic composition of claim 1, wherein the aromatic carboxylic acid includes 4-hydroxy-4'-biphenylcarboxylic acid, 4'-hydroxyphenyl-4-benzoic acid, 3'-hydroxyphenyl-4-benzoic acid, 4,4'-bibenzoic acid, or a combination thereof.

5. The thermoplastic composition of claim 1, wherein the aromatic carboxylic acid includes 1-naphthoic acid, 2-naphthoic acid, 2-hydroxy-6-naphthoic acid, 2-hydroxy-5-naphthoic acid, 3-hydroxy-2-naphthoic acid, 2,6-naphthalenedicarboxylic acid, 2,3-naphthelenedicarboxylic acid, or a combination thereof.

6. The thermoplastic composition of claim 5, wherein the aromatic carboxylic acid includes 2,6-naphthalenedicarboxylic acid.

7. The thermoplastic composition of claim 1, wherein aromatic carboxylic acids constitute from about 1 wt. % to about 10 wt. % of the thermoplastic composition.

8. The thermoplastic composition of claim 1, wherein the weight ratio of thermotropic liquid crystalline polymers to aromatic carboxylic acids in the thermoplastic composition is from about 10 to about 60.

9. The thermoplastic composition of claim 1, wherein the thermotropic liquid crystalline polymer comprises monomer units derived from 4-hydroxybenzoic acid, terephthalic acid, hydroquinone, 4,4'-biphenol, acetaminophen, or a combination thereof.

10. The thermoplastic composition of claim 9, wherein the thermotropic liquid crystalline polymer further contains monomer units derived from 6-hydroxy-2-naphthoic acid in an amount of 15 mol. % or less.

11. The thermoplastic composition of claim 1, wherein the thermoplastic composition has a melt viscosity of from about 0.5 to about 50 Pa-s, as determined in accordance with ISO Test No. 11443 at a shear rate of 1000 seconds$^{-1}$ and temperature that is 15° C. above the melting temperature of the thermoplastic composition.

12. The thermoplastic composition of claim 1, wherein the thermoplastic composition further comprises glass fibers.

13. A molded part comprising the thermoplastic composition of claim 1.

14. A molded part having at least one dimension of about 500 micrometers or less, wherein the molded part contains a thermoplastic composition that comprises at least one thermotropic liquid crystalline polymer, wherein the total amount of repeating units in the thermotropic liquid crystalline polymer derived from naphthenic hydroxycarboxylic and/or naphthenic dicarboxylic acids is no more than 15 mol. %, the thermoplastic composition further comprising at least one aromatic carboxylic acid.

15. The molded part of claim 14, wherein the thermoplastic composition has a melt viscosity of from about 0.5 to about 50 Pa-s, as determined in accordance with ISO Test No. 11443 at a shear rate of 1000 seconds$^{-1}$ and temperature that is 15° C. above the melting temperature of the thermoplastic composition.

16. The molded part of claim 14, wherein the molded part exhibits a V0 rating as determined in accordance with UL94 after conditioning for 48 hours at 23° C. and 50% relative humidity.

17. The molded part of claim 14, wherein the molded part exhibits a total number of drips of 1 or less, determined in accordance with UL94 at a thickness of 0.8 mm after conditioning for 48 hours at 23° C. and 50% relative humidity.

18. The molded part of claim 14, wherein the molded part exhibits a blister free temperature of about 240° C. or greater.

19. An electrical connector that comprises opposing walls between which a passageway is defined for receiving a contact pin, wherein at least one of the walls contains the molded part of claim 14.

20. The molded part of claim 14, wherein one or more conductive elements are applied to the molded part.

21. The molded part of claim 20, wherein the one or more conductive elements are resonating antenna elements, inverted-F antenna structures, closed and open slot antenna structures, loop antenna structures, monopoles, dipoles, planar inverted-F antenna structures, or a combination thereof.

22. A handheld device that comprises an antenna structure, wherein the antenna structure comprises the molded part of claim 21.

23. An integrated circuit comprising the molded part of claim 20.

24. An electronic component that comprises the molded part of claim 14.

25. The electronic component of claim 24, wherein the electronic component is a cellular telephone, laptop computer, small portable computer, wrist-watch device, pendant device, headphone or earpiece device, media player with wireless communications capabilities, handheld computer, remote controller, global positioning system, handheld gaming device, battery cover, speaker, integrated circuit, electrical connector, camera module, or a combination thereof.

26. The electronic component of claim 25, wherein the electronic component is an electrical connector.

27. The electronic component of claim 25, wherein the electronic component is a camera module.

28. The electronic component of claim 25, wherein the electronic component is a cellular telephone.

29. A printer part comprising the molded part of claim 14.

* * * * *